(12) United States Patent
Handford et al.

(10) Patent No.: US 9,389,624 B2
(45) Date of Patent: Jul. 12, 2016

(54) CONTROL CIRCUITRY FOR STABILISING A DC VOLTAGE OUTPUTTED BY AN EXTERNAL DC POWER SUPPLY AGAINST CHANGES IN AMBIENT TEMPERATURE

(71) Applicant: Shimadzu Research Laboratory (Europe) Ltd., Manchester, Greater Manchester (GB)

(72) Inventors: John Handford, Greater Manchester (GB); Stuart Harley, Greater Manchester (GB)

(73) Assignee: Shimadzu Research Laboratory (Europe) Ltd., Manchester (GB)

( * ) Notice: Subject to any disclaimer, the term of this patent is extended or adjusted under 35 U.S.C. 154(b) by 253 days.

(21) Appl. No.: 14/073,323

(22) Filed: Nov. 6, 2013

(65) Prior Publication Data
US 2014/0125301 A1 May 8, 2014

(30) Foreign Application Priority Data
Nov. 6, 2012 (GB) .................................. 1219941.0

(51) Int. Cl.
*G05F 1/567* (2006.01)
*G05F 1/46* (2006.01)
*H02M 1/32* (2007.01)

(52) U.S. Cl.
CPC .............. *G05F 1/567* (2013.01); *G05F 1/467* (2013.01); *G05F 1/468* (2013.01); *G05F 1/462* (2013.01); *H02M 2001/327* (2013.01)

(58) Field of Classification Search
CPC ........... G05F 1/46; G05F 1/462; G05F 1/468; G05F 1/567; G05F 1/467; H02M 1/32; H02M 2001/327

USPC .................................................. 327/18, 688
See application file for complete search history.

(56) References Cited

U.S. PATENT DOCUMENTS

| 3,559,039 A | * | 1/1971 | Nishiwaki et al. ...... G05F 1/567 307/51 |
| 3,956,661 A | | 5/1976 | Sakamoto et al. |
| 5,414,340 A | * | 5/1995 | Gannon ................... G05F 1/563 323/266 |
| 6,700,118 B2 | | 3/2004 | Yefchak et al. |
| 6,737,760 B2 | | 5/2004 | Jenni |
| 2003/0169605 A1 | | 9/2003 | Asano |
| 2005/0088466 A1 | * | 4/2005 | Smith ................... B41J 2/04541 347/5 |
| 2006/0055382 A1 | * | 3/2006 | Cuadra ............. H02M 3/33523 323/280 |

(Continued)

FOREIGN PATENT DOCUMENTS

| EP | 0 504 979 A2 | 9/1992 |
| EP | 0 747 798 A2 | 6/1996 |

(Continued)

Primary Examiner — Fred E Finch, III
(74) Attorney, Agent, or Firm — Sughrue Mion, PLLC

(57) ABSTRACT

Control circuitry for stabilizing a DC voltage outputted by a DC power supply against changes in ambient temperature. The control circuitry includes: measurement circuitry configured to output a measurement voltage representative of a DC voltage outputted by a DC power supply; reference circuitry configured to output a reference voltage; and comparison circuitry configured to compare the measurement voltage with the reference voltage and, based on the comparison, output a control signal for controlling the DC voltage outputted by the DC power supply. At least one temperature-sensitive component of the control circuitry is located in an enclosure configured to maintain a substantially constant temperature within the enclosure.

20 Claims, 9 Drawing Sheets

(56) References Cited

U.S. PATENT DOCUMENTS

| | | | | |
|---|---|---|---|---|
| 2011/0002070 A1* | 1/2011 | De Anna | ............... | H02M 1/32 361/37 |
| 2012/0223849 A1* | 9/2012 | Brown | ............... | H02M 1/36 341/131 |
| 2013/0229840 A1* | 9/2013 | Nakamori | ............... | H02M 1/32 363/50 |
| 2014/0312857 A1* | 10/2014 | Zheng | ............... | H02M 1/32 323/234 |

FOREIGN PATENT DOCUMENTS

| | | |
|---|---|---|
| GB | 1 326 523 A | 8/1973 |
| JP | 60-243718 A | 12/1985 |

\* cited by examiner

HPR +SHVPS 3kV
AC coupled
27nF/100Meg Ohm
(-3dB @ 58mHz)
over 100 seconds.

20mVp-p ≡ 6.6ppm

Filter ON

HPR +SHVPS 3kV
AC coupled
27nF/100Meg Ohm
(-3dB @ 58mHz)
over 100 seconds.
10Hz to 10kHz BW Filter ON HPR +SHVPS 3kV
AC coupled
27nF/100Meg Ohm
(-3dB @ 58mHz)
over 100 seconds.
10Hz to 10kHz BW

CONTROL CIRCUITRY FOR STABILISING A DC VOLTAGE OUTPUTTED BY AN EXTERNAL DC POWER SUPPLY AGAINST CHANGES IN AMBIENT TEMPERATURE

This invention generally relates to control circuitry for stabilising a DC voltage outputted by a DC power supply, e.g. against changes in ambient temperature. This invention also generally relates to noise reduction circuitry for reducing noise in a DC voltage outputted by a DC power supply. The DC power supply may, for example, be a "high voltage" DC power supply capable of supplying a voltage of 1000 Volts or more.

It is known for DC power supplies to incorporate control circuitry for stabilising a DC voltage outputted by the DC power supply so that the DC voltage outputted by the DC power supply is kept substantially constant. Such control circuitry often employs a so-called "negative feedback loop", in which the DC voltage outputted by the DC power supply is controlled based on a comparison of the DC voltage outputted by the DC power supply with a fixed reference voltage.

The present invention relates to an observation by the present inventors that at least some, if not all, of the components used in conventional control circuitry for stabilising a DC voltage outputted by a DC power supply are temperature-sensitive to a certain extent, in that their performance varies with changes in temperature. Hence, a change in temperature can result in a change in the DC voltage outputted by a DC power supply, even when control circuitry employing a "negative feedback loop" is used.

To a certain extent, the inventors have observed that these problems can be addressed by using expensive components that are less sensitive to changes in temperature. However, the inventors have found that even using the best commercially available components can lead to control circuitry whose performance changes by a few parts per million ("ppm") per ° C. in temperature change, which may represent an unacceptable variation in applications where an extremely stable DC voltage is desirable, e.g. for high voltage power supplies used for example in mass spectrometry or electron microscopes.

The present invention has been devised in light of the above considerations.

In general, a first aspect of the invention may provide control circuitry for stabilising a DC voltage outputted by a DC power supply against changes in ambient temperature, wherein at least one temperature-sensitive component of the control circuitry is located in an enclosure configured to maintain a substantially constant temperature within the enclosure.

The inventors have found that by locating the at least one temperature-sensitive component of the control circuitry in such an enclosure, a marked improvement in the stability of the DC voltage outputted by the DC power supply against changes in ambient temperature can be achieved, since the at least one temperature-sensitive component located in the enclosure is protected (to at least some extent) from changes in ambient temperature. Further, this marked improvement can be achieved without necessarily requiring the use of expensive components that are less sensitive to changes in temperature.

Preferably, the first aspect of the invention provides a control circuitry arrangement that includes control circuitry for stabilising a DC voltage outputted by a DC power supply against changes in ambient temperature, the control circuitry including:

measurement circuitry configured to output a measurement voltage representative of a DC voltage outputted by a DC power supply;

reference circuitry configured to output a reference voltage; and comparison circuitry configured to compare the measurement voltage with the reference voltage and, based on the comparison, output a control signal for controlling the DC voltage outputted by the DC power supply;

wherein at least one temperature-sensitive component of the control circuitry is located in an enclosure configured to maintain a substantially constant temperature within the enclosure.

The DC power supply may be a high voltage DC power supply, e.g. capable of supplying a voltage of 1000 Volts or more. High voltage DC power supplies are often used in applications where a producing a stable DC voltage is important, e.g. mass spectrometry or electron microscopes. However, the same principles apply equally to other types of DC power supplies.

Herein, when temperature within the enclosure is described as being maintained substantially constant, it is preferably meant that, for a given change in ambient temperature (which may be e.g. by 5° C., 10° C., or 20° C.), the temperature within the enclosure changes by an amount that is less than the change in ambient temperature. Accordingly, the enclosure may be viewed as being configured to control the temperature within the enclosure such that, for a given change in ambient temperature (e.g. 10° C.), the temperature within the enclosure changes by an amount that is less than the change in ambient temperature. Preferably, the enclosure is configured to control the temperature within the enclosure such that, for a given change in ambient temperature (e.g. 10° C.), the temperature in the enclosure changes by an amount that is a proportion (preferably 20% or less, more preferably 10% or less, more preferably 5% or less), more preferably a small proportion (preferably 1% or less, more preferably 0.5% or less, more preferably 0.2% or less) of the change in ambient temperature. In this context, a smaller proportion is preferred because this helps to further reduce any variation in performance of the temperature-sensitive components that may be caused by a change in ambient temperature.

Preferably, the control circuitry and enclosure are included in a control module for stabilising a DC voltage outputted by an external DC power supply, i.e. for stabilising a DC voltage outputted by a DC power supply that is external to the control module against changes in ambient temperature. This arrangement is preferred because it improves flexibility, in the sense that the temperature stabilisation of an existing DC power supply can be improved, without the need to rebuild or retrofit that power supply with new components.

The control module may include, for example, a control signal output configured to output the control signal outputted by the comparison circuitry, e.g. so as to be received at a control signal input of the external DC power supply.

The control module may include, for example, a coupling means for coupling the DC voltage outputted by the DC power supply to the measurement circuitry. The coupling means may for example include a DC input configured to receive the DC voltage outputted by the external DC power supply. The control module may further include a DC output, coupled to the DC input, so as to re-output the DC voltage received at the DC input.

The DC power supply may have its own control circuitry for stabilising the DC voltage outputted by the DC power supply, e.g. having its own measurement circuitry, reference circuitry and comparison circuitry. Thus, the control circuitry included in the control module may be additional to (and preferably work alongside and influence) the control circuitry already present in the DC power supply.

Although the control circuitry and enclosure are preferably included in a control module that is separate from the DC power supply, in other embodiments, the control circuitry and enclosure may be included in, i.e. form part of, the DC power supply itself.

The at least one temperature-sensitive component of the control circuitry may, for example, include any one or more components of the measurement circuitry, any one or more components of the reference circuitry and/or any one or more components of the comparison circuitry. For example, the at least one temperature-sensitive component may include any one or more (preferably all) of a voltage divider of the measurement circuitry, a DAC (digital to analogue converter) of the reference circuitry, an analogue voltage source of the reference circuitry, and a comparator, e.g. an op-amp, of the comparison circuitry.

It should be apparent that there are many different ways in which the enclosure may be configured to maintain a substantially constant temperature within the enclosure, e.g. such that, for a given change in ambient temperature, the temperature in the enclosure changes by an amount that is a proportion (e.g. 20% or less, 10% or less, 5% or less), more preferably a small proportion (e.g. 1% or less, 0.5% or less, or 0.2% or less) of a given change in ambient temperature (e.g. 10° C.). By way of example, it has been found experimentally that, for a change in ambient temperature by 10° C., the temperature within an enclosure made in accordance with the teaching provided herein in connection with FIGS. 2 and 3 can change by as little as 0.014° C., i.e. by an amount that is 0.14% (~1/700) of the change in ambient temperature. Placing a temperature-sensitive component having a thermal drift of 25 ppm/° C. in such an enclosure would effectively reduce the thermal drift of that component to 0.035 ppm/° C. (25× 0.14/100).

Examples of different ways in which an enclosure may be configured to maintain a substantially constant temperature within the enclosure will now be described. These may be used separately, or in combination.

Preferably, the enclosure includes thermally conductive walls, e.g. of aluminium. Preferably, the enclosure contains thermally conductive material which is in contact with at least one temperature-sensitive component of the control circuitry located in the enclosure. The thermally conductive material is preferably electrically insulative, and may, for example, be electrically insulative potting material (which may also be referred to as encapsulant), such as thermally conductive silicone rubber or epoxy resin. These features may help to distribute heat evenly throughout the enclosure, thereby helping to minimise the thermal gradient through the enclosure and to maintain a substantially constant temperature within the enclosure.

Preferably, the enclosure is thermally insulated by thermal insulation, e.g. expanded polystyrene (also referred to as polystyrene foam), which preferably surrounds the enclosure. This may help to reduce the amount of heat entering into and escaping from the enclosure, thereby helping to minimise the thermal gradient through the enclosure and to maintain a substantially constant temperature within the enclosure.

Preferably, the enclosure is provided with a temperature control unit configured to heat and/or cool the enclosure so as to maintain a substantially constant temperature within the enclosure.

Preferably, the temperature control unit is configured to heat and cool (i.e. provide both a heating function and a cooling function, but not necessarily at the same time) the enclosure so as to maintain a substantially constant temperature within the enclosure.

The temperature control unit may include a thermoelectric device configured to heat and/or cool the enclosure. A preferred thermoelectric device is a peltier device (which may also be referred to as a peltier cooler). A peltier device is preferred as it is able to perform both heating and cooling functions, depending on which direction current is passed through it. Furthermore, magnitude of the heating/cooling function can be controlled by the magnitude of current through the peltier device.

The temperature control unit preferably includes a heat sensor, preferably a thermistor, configured to measure the temperature within the enclosure, e.g. it may be located in or near to the enclosure and/or be configured to output a signal representative of the temperature within the enclosure. Preferably, the temperature control unit further includes a control means configured, based on an output of the heat sensor, to control the thermoelectric device to heat and/or cool the enclosure so as to maintain a substantially constant temperature within the enclosure.

Preferably, at least one temperature-sensitive component of the control circuitry is mounted on a control circuitry region of a circuit board.

Preferably, the control circuitry region and the enclosure are mutually configured to allow the control circuitry region to be inserted into the enclosure. For example, this may be achieved by configuring the control circuitry region to project outwardly from the circuit board and by providing a corresponding opening (e.g. a slot) in the enclosure.

Preferably, the enclosure has at least two compartments, preferably with at least one temperature-sensitive component of the control circuitry being located in a first of the compartments and at least one other temperature-sensitive component of the control circuitry being located in a second of the compartments. This allows any high voltage temperature-sensitive components (e.g. a voltage divider) to be located in a separate compartment from other temperature-sensitive components, thereby providing increased electrical insulation between those components.

Preferably, the measurement circuitry includes a voltage divider (which may be referred to as a "resistor" divider or "resistive" divider) configured to output a measurement voltage representative of a DC voltage outputted by a DC power supply. The voltage divider preferably includes two resistors arranged in series and configured to receive the DC voltage outputted by the DC power supply.

Preferably, a first of the two resistors has a resistance that is $n-1$ times larger than second of the two resistors, where n is more than 1 (and need not be an integer).

The ratio $(n-1):1$ may be referred to as the "divider ratio". The divider ratio can be matched to suit the DC power supply maximum output and reference. For relatively low voltage power supplies (e.g. a 250V or 50V DC power supply), the divider ratio may be relatively small, e.g. a divider ratio of 2:1 could be used for a 20 V DC power supply with a 10V reference. For relatively high voltage power supplies (e.g. a 2.5 kV, 5 kV or 10 kV DC power supply), the divider ratio may be relatively large, e.g. a divider ratio of 1000:1 (n=1000) could be used for a 10 kV DC power supply, a divider ratio of 500:1 (n=500) could be used for a 5 kV DC power supply, and a divider ratio of 250:1 (n=250) could be used for a 2.5 kV DC power supply.

For a high voltage DC power supply, n may be 250 or more, more preferably 500 or more, or 1000 or more.

Preferably, the measurement circuitry is configured such that the measurement voltage is the voltage across the second resistor. Thus, the measurement voltage will, in general, be proportional to, and therefore representative of, the DC voltage outputted by the DC power supply. Provided n is large, the measurement voltage will in general be small.

Preferably, the reference circuitry includes a digital to analogue converter (DAC) configured to output the reference voltage. By producing the reference voltage using a DAC, thermal EMF errors may be avoided. Also, the galvanic isolation provided by the DAC may help to remove ground reference errors.

Preferably, the DAC is configured to output the reference voltage based on a preliminary reference voltage outputted by an analogue voltage source and a digital control signal outputted by a digital control unit, e.g. such that the reference voltage outputted by the DAC is a proportion of the preliminary reference voltage outputted by the analogue voltage source.

The reference circuitry may therefore include an analogue voltage source configured to output a preliminary voltage reference and/or a digital control unit configured to control the reference voltage outputted by the DAC. In general, the DAC and analogue voltage source will be temperature-sensitive and are therefore preferably located in an enclosure 150 of the control module 110 (see above). However, the digital control unit (whose performance will generally be unaffected by changes in ambient temperature), could potentially be located externally to the enclosure and could even be located externally to a control module in which the enclosure is located.

Preferably, the comparison circuitry is configured, based on the comparison between the measurement voltage and the reference voltage, to output a control signal for controlling the DC voltage outputted by the DC power supply such that the DC voltage outputted by the DC power supply is kept substantially constant.

Herein, when the DC voltage outputted by the DC power supply is described as being kept substantially constant, it is preferably meant that the DC voltage outputted by the DC power supply is maintained so that it does not vary by more than a predetermined tolerance (preferably $\pm 10,000$ ppm or less, more preferably $\pm 1,000$ ppm or less, more preferably $\pm 100$ ppm or less, more preferably $\pm 10$ ppm or less, more preferably $\pm 5$ ppm or less, more preferably $\pm 1$ ppm or less) for a given change in ambient temperature (e.g. $\pm 5°$ C. or less, or $\pm 10°$ C. or less). Thus, by way of example, if the DC voltage outputted by the DC power supply is equal to 5000V, the DC voltage outputted by the DC power supply may be maintained so that it does not vary by more than $\pm 1$ ppm ($\pm 5$ mV) for a change in ambient temperature of $\pm 10°$ C.

Preferably, the comparison circuitry is configured, based on the comparison between the measurement voltage and the reference voltage, to output a control signal for controlling the DC voltage outputted by the DC power supply such that the DC voltage outputted by the DC power supply is equal to a predetermined voltage within a predetermined tolerance (preferably $\pm 20\%$ or less, more preferably $\pm 10\%$ or less, $\pm 5\%$ or less, $\pm 1\%$ or less, $\pm 0.5\%$ or less, $\pm 0.1\%$ or less) at a predetermined temperature (e.g. 21° C.). For example, the DC voltage outputted by the DC power supply may controlled to be equal to 5000 V within a predetermined tolerance of $\pm 1\%$ at an ambient temperature of 21° C. Whilst it may be desirable for the DC voltage outputted by the DC power supply to be equal to a predetermined voltage within a very small predetermined tolerance (e.g. $\pm 1\%$), this is not actually so important for some applications, such as mass spectrometry. This is because it is usually straight forward to adjust the DC voltage outputted by the DC power supply to be a desired value (e.g. in the embodiment of the invention described below this could be done by adjusting the DAC 130). Thus, for many applications, the DC voltage outputted by the DC power supply may be equal to a predetermined voltage within a relatively wide predetermined tolerance, e.g. $\pm 1\%$ (i.e. $\pm 10,000$ ppm). For example, even with a relatively wide tolerance of $\pm 1\%$, it would be relatively straight forward to calibrate a mass spectrometry instrument using a reference material element of known mass, e.g. by adjusting the DC voltage outputted by the DC power supply so that the mass "peak" recorded matches the known mass of the reference sample.

However, it is in general much more desirable for the DC voltage outputted by the DC power supply to be maintained so that it does not vary by more than a very small predetermined tolerance (e.g. $\pm 1$ ppm) for a given change in ambient temperature (e.g. $\pm 5°$ C. or $\pm 10°$ C.). This is because it is, in general, very difficult to correct for a change in output voltage due to a change in ambient temperature since there is not normally an easy way of telling whether, by what extent or by how much such a change has occurred. For example, for a mass spectrometry instrument, if the DC voltage outputted by the DC power supply varies significantly over time due to a change in ambient temperature, this will alter the mass measurements recorded by the mass spectrometry instrument and may cause an error. Mass accuracy is of course very important for mass spectrometers in order to be able to resolve different elements.

Many commercially available DC power supplies, particularly high voltage DC power supplies, include a control signal input as standard. Typically, such power supplies are configured to be controlled such that the DC voltage outputted is positively correlated (e.g. proportional) to the voltage at the control signal input.

The control circuitry may therefore be configured such that the control signal outputted by the comparison circuitry is receivable (directly or indirectly) at a control input of the DC power supply. For the avoidance of any doubt, the control signal outputted by the comparison circuitry may be received directly or indirectly at the control input of the DC power supply since, for example, the control signal may be conditioned e.g. by conditioning circuitry external to the control circuitry, before it is received at the control input.

Preferably, the comparison circuitry includes a comparator configured to compare the measurement voltage with the reference voltage and, based on the comparison, output a signal that is representative of the difference between the measurement voltage and the reference voltage. Preferably, the comparator is an operational amplifier (op-amp) configured to compare the measurement voltage with the reference voltage and, based on the comparison, output a voltage signal that is representative of the difference between the measurement voltage and the reference voltage.

Preferably, the gain of the op-amp is high, e.g. 100 dB (100,000) or higher.

In voltage terms, a Vout/Vin dB ratio may be given by 20 log(Vout/Vin). Thus, if the gain is Vout/Vin=100,000, then log of this is 5 and this value multiplied by 20 is 100 dB. In power terms, a P1/P2 dB ratio may be given by 10 log(Pout/Pin). So, for a power gain (Pout/Pin) of 10,000,000,000 or $10^{10}$, then log of this is 10 and this value multiplied by 10 gives you 100 dB. A voltage gain of 100 dB is equivalent to a power gain of 100 dB, since power is proportional to voltage squared (such that a voltage ratio of 100,000 equates to a power ratio of $10^{10}$).

The signal outputted by the comparator (which is preferably a voltage signal outputted by an op-amp) may, in some embodiments, be the control signal outputted by the comparison circuitry for controlling the DC power supply.

Preferably, however, the comparison circuitry includes conditioning means for conditioning the signal outputted by the comparator, preferably such that the conditioned signal is the control signal outputted by the comparison circuitry for controlling the DC voltage outputted by the DC power supply. For example, the conditioning means may include a damping means configured to damp the signal outputted by the comparator. In this case, the resulting damped signal may be the control signal for controlling the DC power supply. Use of such damping means is preferred because it may help to smooth any rapid oscillations within the signal outputted by the comparator, thereby helping to smooth the DC voltage $V_{DC}$ outputted by the DC power supply.

Preferably, the control signal outputted by the comparison circuitry (e.g. the signal outputted by the above-described comparator or the conditioned signal produced by the above-described conditioning means) is used directly to control the DC power supply, e.g. it may be received directly at a control signal input of the DC power supply. However, it embodiments are equally possible in which the control signal outputted by the comparison circuitry is used indirectly to control the DC power supply. For example, the control signal outputted by the comparison circuitry may be modified or conditioned in some way by a conditioning means that is not part of the control circuitry, before it is received at a control signal input of the DC power supply.

Preferably, the control circuitry includes noise reduction circuitry for reducing noise in the DC voltage outputted by the DC power supply, the noise reduction circuit comprising:
   an extracting means configured to extract a noise component from the DC voltage outputted by the DC power supply;
   an inverting means configured to invert the noise component; and
   a combining means configured to combine the inverted noise component with the DC voltage outputted by the DC power supply.

The noise reduction circuitry may be configured to receive the DC voltage outputted by the DC power supply either before or after the DC voltage has been received by the control circuitry described above. The noise reduction circuitry need not be located in the same enclosure as the control circuitry.

Preferably, the extracting means includes a DC blocking capacitor, which is preferably configured to extract the noise component by extracting only AC changes from the DC voltage outputted by the DC power supply.

Preferably, the inverting means includes an op-amp, whose inverting input is connected (directly or indirectly) to the extracting means. The other input of the op-amp is preferably held constant at a ground potential.

Preferably, the combining means includes a DC blocking capacitor, which is preferably configured to combine the inverted noise component from the inverting means with the DC voltage outputted by the DC power supply.

Advantageously, if the DC power supply is a high voltage DC power supply and high voltage DC blocking capacitors are respectively included in the extracting means and combining means, then the inverting means, which is preferably an op-amp 330, is able to operate at near ground potential and so does not need to be of a high voltage type.

Preferably, the control circuitry (and/or noise reduction circuitry) is for use with a (e.g. high voltage) DC power supply of a mass spectrometer, e.g. a MALDI TOF mass spectrometer. A stable DC voltage is particularly important for a mass spectrometer because the mass accuracy of a mass spectrometer is in general proportional to a significant extent to the variation of DC voltages used, e.g. for accelerating and focussing the charged particles. Thus, power supply stability is a critical part of the design and accuracy of a mass spectrometer.

Additionally or alternatively, the control circuitry (and/or noise reduction circuitry) could also be for use with a (e.g. high voltage) DC power supply of an electron microscope. A stable DC voltage is particularly important for an electron microscope because the DC voltages used by electron microscopes can affect the focussing and deflection of an electron beam produced by the electron microscope. The stability of a DC power supply used can directly affect the resolution of an electron microscope.

The first aspect of the invention may provide an apparatus including the control circuitry (and/or noise reduction circuitry). Preferably, the apparatus further includes the DC power supply.

Preferably, the DC power supply is configured to receive (directly or indirectly) the control signal at a control signal input of the DC power supply. Many commercially available DC power supplies, particularly high voltage DC power supplies, include a control signal input as standard. Typically, such power supplies are configured to be controlled such that the DC voltage outputted is positively correlated (e.g. proportional) to the voltage at the control signal input.

The control circuitry and the enclosure may, in some embodiments, be incorporated into the DC power supply. Preferably, however, the control circuitry and the enclosure are included in a control module external to the DC power supply, as described above.

The DC power supply may be a (e.g. high voltage) DC power supply of a mass spectrometer, e.g. a MALDI TOF mass spectrometer. A stable DC voltage is particularly important for a mass spectrometer for the reasons already given.

The apparatus may itself be a mass spectrometer, e.g. a MALDI TOF mass spectrometer. Accordingly, the first aspect of the invention may provide a mass spectrometer including the control circuitry, and preferably further including the DC power supply.

The first aspect of the invention may further provide a method of stabilising a DC voltage outputted by a DC power supply against changes in ambient temperature using control circuitry that includes measurement circuitry, reference circuitry and comparison circuitry, the method including:
   the measurement circuitry outputting a measurement voltage representative of a DC voltage outputted by a DC power supply;
   the reference circuitry outputting a reference voltage; and
   the comparison circuitry comparing the measurement voltage with the reference voltage and, based on the comparison, outputting a control signal for controlling the DC voltage outputted by the DC power supply;
   wherein at least one temperature-sensitive component of the control circuitry is located in an enclosure and a substantially constant temperature is maintained within the enclosure during the method.

This method may include any method step implementing or corresponding to any apparatus feature described in connection with this aspect of the invention.

A second aspect of the invention may provide a control module for stabilising a DC voltage outputted by an external DC power supply against changes in ambient temperature, i.e. for stabilising a DC voltage outputted by a DC power supply that is external to the control module against changes in ambient temperature.

Using an external module to provide temperature stabilisation is advantageous, because it means that it can be used with a number of different power supplies, without the need to rebuild or retrofit those power supplies with new components.

The control module may, for example, have circuitry configured to output a control signal for controlling the DC voltage outputted by the DC power supply, preferably such that the DC voltage outputted by the DC power supply is kept substantially constant. This circuitry may be the above-described control circuitry, but other circuitry is also possible.

Preferably, the control module includes control circuitry for stabilising a DC voltage outputted by a DC power supply against changes in ambient temperature e.g. as explained above, preferably with at least one temperature-sensitive component of the control circuitry being located in an enclosure configured to maintain a substantially constant temperature within the enclosure e.g. as explained above.

The control circuitry and/or enclosure may have any feature described above in connection with the first aspect of the invention. However, other ways for a control module to stabilise the DC voltage outputted by a DC power supply against changes in ambient temperature could be envisaged.

A third aspect of the invention may provide noise reduction circuitry for reducing noise in a DC voltage outputted by a DC power supply, the noise reduction circuit comprising:
- an extracting means configured to extract a noise component from the DC voltage outputted by the DC power supply;
- an inverting means configured to invert the noise component; and
- a combining means configured to combine the inverted noise component with the DC voltage outputted by the DC power supply.

The noise reduction circuitry may have any feature described above in connection with the first aspect of the invention, but need not be used in combination with the control circuitry described in connection with the first aspect of the invention.

The third aspect of the invention may further provide a method of reducing noise in a DC voltage outputted by a DC power supply, the method including:
- an extracting means extracting a noise component from the DC voltage outputted by the DC power supply;
- an inverting means inverting the noise component; and
- a combining means combining the inverted noise component with the DC voltage outputted by the DC power supply.

This method may include any method step implementing or corresponding to any apparatus feature described in connection with any aspect of the invention described herein.

The invention also includes any combination of the aspects and preferred features described except where such a combination is clearly impermissible or expressly avoided.

Examples of these proposals are discussed below, with reference to the accompanying drawings in which.

FIG. 10 contains plots showing the results of analysis performed in the third experiment.

Figure 1:
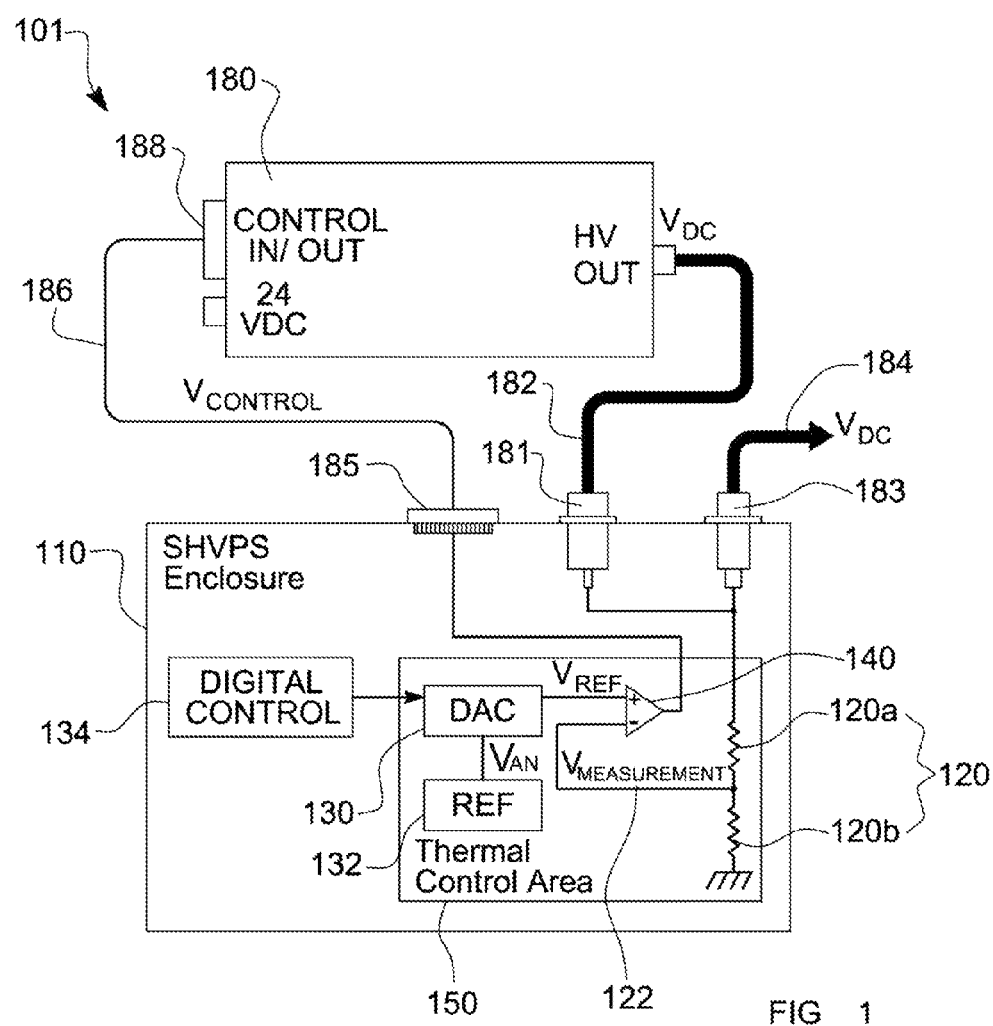
FIG. 1 shows an apparatus including a control module for stabilising a DC voltage outputted by a DC power supply against changes in ambient temperature.

FIG. 1 shows an apparatus 101 including a control module 110 for stabilising a DC voltage $V_{DC}$ outputted by a DC power supply 180 against changes in ambient temperature.

Preferably, the DC power supply 180 is a proprietary, i.e. commercially available, "high voltage" DC power supply 180 capable of outputting a DC voltage $V_{DC}$ of 1000 Volts or more. In this case, the apparatus 101 may for convenience be referred to as a "Stable High Voltage Power Supply" or "SHVPS".

The control module 110 preferably includes a control circuitry arrangement that includes control circuitry for stabilising the DC voltage $V_{DC}$ outputted by the DC power supply 180 against changes in ambient temperature, with the control circuitry preferably including measurement circuitry, reference circuitry and comparison circuitry as will be described in more detail below.

The control module 110 also includes: a DC input 181 configured to receive, via a power line 182, the DC voltage $V_{DC}$ outputted by the DC power supply 180; a DC output 183 configured to re-output, via a power line 184, the DC voltage $V_{DC}$ received at the DC input 181; and a control signal output 185 configured to output, via a control signal line 186, a control signal $V_{CONTROL}$ outputted by, e.g. comparison circuitry of, the control circuitry.

The control circuitry preferably includes measurement circuitry configured to output a measurement voltage $V_{MEASUREMENT}$ representative of the DC voltage $V_{DC}$ outputted by the DC power supply 180.

Preferably, the measurement circuitry includes a voltage divider 120 that is configured to output the measurement voltage $V_{MEASUREMENT}$ via a measurement voltage line 122. The voltage divider 120 preferably includes two resistors 120a, 120b arranged in series and configured to receive the DC voltage $V_{DC}$ outputted by the DC power supply 180.

Preferably, the first resistor 120a has a resistance that is n−1 times larger than the second resistor 120b, where n is more than 1 (and need not be an integer). This means that, in use, the voltage $V_2$ across the second resistor 120b will, in general, be a small fraction ($V_{DC}/n$) of the DC voltage $V_{DC}$ outputted by the DC power supply 180, and the voltage $V_1$ across the first resistor 120a will, in general, be the remaining fraction ((n−1)*$V_{DC}/n \sim V_{DC}$, where n is large) of the DC voltage $V_{DC}$ outputted by the DC power supply 180.

Preferably, the measurement circuitry is configured (e.g. by appropriately connecting the measurement voltage line 122 to the voltage divider 120) such that the measurement voltage $V_{MEASUREMENT}$ is the voltage $V_2$ across the second resistor 120b. Thus, the measurement voltage $V_{MEASUREMENT}$ ($V_{DC}/n$) will, in general, be proportional to, and therefore representative of, the DC voltage $V_{DC}$ outputted by the DC power supply 180. The measurement voltage will in general be equal to $V_{DC}/n$.

Preferably, the control circuitry is configured to output the voltage across the voltage divider 120. This voltage will in general be approximately equal to the DC voltage $V_{DC}$ outputted by the DC power supply 180. Where the DC power supply 180 is a "high voltage" power supply, n is preferably 250 or more, more preferably 500 or more, or 1000 or more.

The control circuitry preferably includes reference circuitry configured to output a reference voltage $V_{REF}$.

Preferably, the reference circuitry includes a digital to analogue converter (DAC) 130 configured to output the reference voltage $V_{REF}$ (preferably as a proportion of a preliminary reference voltage $V_{AN}$ outputted by an analogue voltage source 132, see below). By producing the reference voltage using the DAC 130, thermal EMF errors may be avoided. Also, any galvanic isolation provided by the digital control unit 134 (see below) may help to remove ground reference errors.

Preferably, the DAC 130 is configured to output the reference voltage $V_{REF}$ based on a preliminary reference voltage $V_{AN}$ outputted by an analogue voltage source 132 and a digital control signal outputted by a digital control unit 134, e.g. such that the reference voltage $V_{REF}$ outputted by the DAC 130 is a proportion of the preliminary reference voltage $V_{AN}$ outputted by the analogue voltage source 132.

The reference circuitry may therefore include an analogue voltage source 132 configured to output a preliminary voltage reference $V_{AN}$ and/or a digital control unit 134 configured to control the reference voltage $V_{REF}$ outputted by the DAC 130. In general, the DAC 130 and analogue voltage source 132 will be temperature-sensitive and are therefore preferably located in an enclosure 150 of the control module 110 (see below). However, the digital control unit 134 (whose performance will generally be unaffected by changes in ambient temperature), could potentially be located externally to the enclosure 150 of the control module, and could even be located externally to the control module 110.

The control circuitry preferably includes comparison circuitry configured to compare the measurement voltage $V_{MEASUREMENT}$ with the reference voltage $V_{REF}$ and, based on the comparison, output a control signal for controlling the DC voltage $V_{DC}$ outputted by the DC power supply 180, preferably such that the DC voltage $V_{DC}$ outputted by the DC power supply 180 is kept substantially constant, preferably so that it does not vary by more than a predetermined tolerance (e.g. ±1 ppm) for a given change in ambient temperature (e.g. ±10° C.). Preferably, the comparison circuitry is further configured to output the control signal such that the DC voltage $V_{DC}$ outputted by the DC power supply 180 is equal to $V_{REF}*n$ within a predetermined tolerance (e.g. ±1%) at a predetermined temperature (e.g. an ambient temperature of 21° C.).

The DC power supply 180 shown in FIG. 1 includes a control signal input 188. Many commercially available DC power supplies, particularly high voltage DC power supplies, include a control signal input such as this as standard. Typically, such power supplies are configured to be controlled such that the DC voltage outputted is positively correlated (e.g. proportional) to the voltage at the control signal input. An example of such a DC power supply is the power supply and described below.

The control circuitry may therefore be configured such that the control signal outputted by the comparison circuitry is received (directly or indirectly) at the control input 188 of the DC power supply 180. For the avoidance of any doubt, the control signal outputted by the comparison circuitry may be received directly or indirectly at the control input of the DC power supply 180, since, for example, the control signal may pass through conditioning circuitry external to the control circuitry before it is received at the control input 188.

Preferably, the comparison circuitry includes a comparator configured to compare the measurement voltage $V_{MEASUREMENT}$ with the reference voltage $V_{REF}$ and, based on the comparison, output a signal that is representative of the difference between the measurement voltage $V_{MEASUREMENT}$ and the reference voltage $V_{REF}$. Preferably, the comparator is an operational amplifier (op-amp) 140 configured to compare the measurement voltage $V_{MEASUREMENT}$ with the reference voltage $V_{REF}$ and, based on the comparison, output a voltage signal $V_{OP-AMP}$ that is representative of the difference between the measurement voltage $V_{MEASUREMENT}$ and the reference voltage $V_{REF}$, e.g. $V_{OP-AMP}=A(V_{REF}-V_{MEASUREMENT})$, where A is a gain of the op-amp 140.

Preferably, the gain A of the op-amp 140 is high, e.g. 100 dB (100,000) or higher. The voltage signal $V_{OP-AMP}$ outputted by the op-amp 140 may, in some embodiments, be the control signal outputted by the comparison circuitry for controlling the DC power supply 180.

Preferably, however, the comparison circuitry includes conditioning means (not shown) for conditioning the voltage $V_{OP-AMP}$ outputted by the op-amp 140, preferably such that the conditioned voltage is the control signal outputted by the comparison circuitry for controlling the DC voltage $V_{DC}$ outputted by the DC power supply 180. For example, the conditioning means may include a damping means (not shown) configured to damp the voltage signal $V_{OP-AMP}$ outputted by the op-amp 140. In this case, the resulting damped voltage may be the control signal for controlling the DC power supply 180. Use of such damping means is preferred because it may help to smooth any rapid oscillations within the voltage signal $V_{OP-AMP}$ outputted by the op-amp 140, thereby helping to smooth the DC voltage $V_{DC}$ outputted by the DC power supply 180.

In either case, however, the control signal outputted by the comparison circuitry may still be received directly or indirectly at the control input 188 of the DC power supply 180.

In use, the control circuitry preferably stabilises the DC voltage $V_{DC}$ outputted by the DC power supply 180 in the following manner. First, the measurement circuitry outputs, via the measurement voltage line 122, the measurement voltage $V_{MEASUREMENT}$, which is representative of the DC voltage $V_{DC}$ outputted by the DC power supply 180. If the measurement voltage $V_{MEASUREMENT}$ exceeds the reference voltage $V_{REF}$ outputted by the DAC 130 of the reference circuitry, then the voltage signal $V_{OP-AMP}$ outputted by the op-amp 140 will be a large negative voltage change, owing to the high gain A of the op-amp 140, which will in turn cause the DC voltage $V_{DC}$ outputted by the DC power supply 180 to decrease. Conversely, if the measurement voltage $V_{MEASUREMENT}$ is less than the reference voltage $V_{REF}$ outputted by the reference circuitry, then the voltage signal $V_{OP-AMP}$ outputted by the op-amp 140 will be a large positive voltage change, owing to the high gain A of the op-amp 140, which will in turn cause the DC voltage $V_{DC}$ outputted by the DC power supply 180 to increase. Rapid oscillations in the voltage signal $V_{OP-AMP}$ outputted by the op-amp 140 can be smoothed by use of the damping means described above.

Thus, it can be seen that the DC voltage $V_{DC}$ outputted by the DC power supply 180 is driven towards a value at which the measurement voltage $V_{MEASUREMENT}$ (which will in general be approximately equal to $V_{DC}/n$) is equal to the reference voltage $V_{REF}$.

Accordingly, the DC voltage $V_{DC}$ outputted by the DC power supply 180 will in general be driven towards a value of $n*V_{REF}$. For example, if n=1000 and $V_{REF}$=5V then the DC voltage $V_{DC}$ outputted by the DC power supply 180 would be driven towards a value of 5000V.

Accordingly, by selecting an appropriate value for the reference voltage $V_{REF}$ and n, the DC power supply 180 can be controlled to output a substantially constant voltage DC voltage $V_{DC}$ having any predetermined value.

To put this in other words, the control signal from the control module 110 controls the DC power supply 180 such that the DC voltage $V_{DC}$ outputted by the DC power supply 180 minimises the differential input voltage ($V_{REF}-V_{MEASUREMENT}$) of the op-amp 140, i.e. according to a "negative feedback" loop.

Although FIG. 1 shows the control circuitry as being contained in a control module 110 that is external to the DC power supply 180, the control circuitry could equally be incorporated into the DC power supply 180 itself. However, it is preferred to have the control circuitry in a control module 110 external to (i.e. separate from) the DC power supply 180, as this improves flexibility, in the sense that the temperature stabilisation of an existing DC power supply can be improved, without the need to rebuild or retrofit that power supply with new components.

The inventors have observed that various errors are associated with certain components of the above-described control circuitry. For example, the performance of these components may be susceptible to drift in performance with ambient temperature (thermal drift) and time (temporal drift). Thermal drift may be specified in parts per million per degree Celsius ("ppm/° C.").

The most temperature-sensitive components in the control circuitry described above are the voltage divider 120, the DAC 130, the analogue voltage source 132 and the op-amp 140. Even using the best commercially available components, the inventors have not been able to find components whose performance in terms of thermal drift is significantly better than the approximate values shown in Table 1 below.

TABLE 1

| Component | Thermal Drift |
|---|---|
| Voltage divider | ~10 ppm/° C. |
| Analogue voltage source | ~0.5 ppm/° C. |
| DAC | ~0.1 ppm/° C. |
| Op-amp | ~0.002 ppm/° C. |
| Total Contribution | ~10.6 ppm/° C. |

As illustrated by Table 1, a change of just 1° C. in temperature will lead to a change in performance of up to ~10.6 ppm/° C. Such variation may be unacceptable in applications where an extremely stable DC voltage is desirable.

To address these issues, at least one temperature-sensitive component of the control circuitry belonging to the control module 110 of FIG. 1 is preferably located in an enclosure 150 configured to maintain a substantially constant temperature within the enclosure 150 (e.g. such that for a change in ambient temperature of 10° C., the temperature within the enclosure 150 changes by an amount that is 10% or less, more preferably 5% or less, more preferably 1% or less of the change in ambient temperature). In this way, the at least one temperature-sensitive component of the control circuitry located in the enclosure 150 is able to perform consistently, even if there is a change in ambient temperature, because it is protected (to at least some extent) from changes in ambient temperature.

Preferably, at least the voltage divider 120 is located in enclosure, as it is the voltage divider whose performance is most affected by a change in temperature (see Table 1 above). However, other components of the control circuitry are also temperature-sensitive, so any one or more of the voltage divider 120, the DAC 130, the analogue voltage source 132 and the op-amp 140 is preferably located in the enclosure also. In FIG. 1, the interior of the thermally insulated enclosure is referred to as a "Thermal Control Area".

Figure 2:
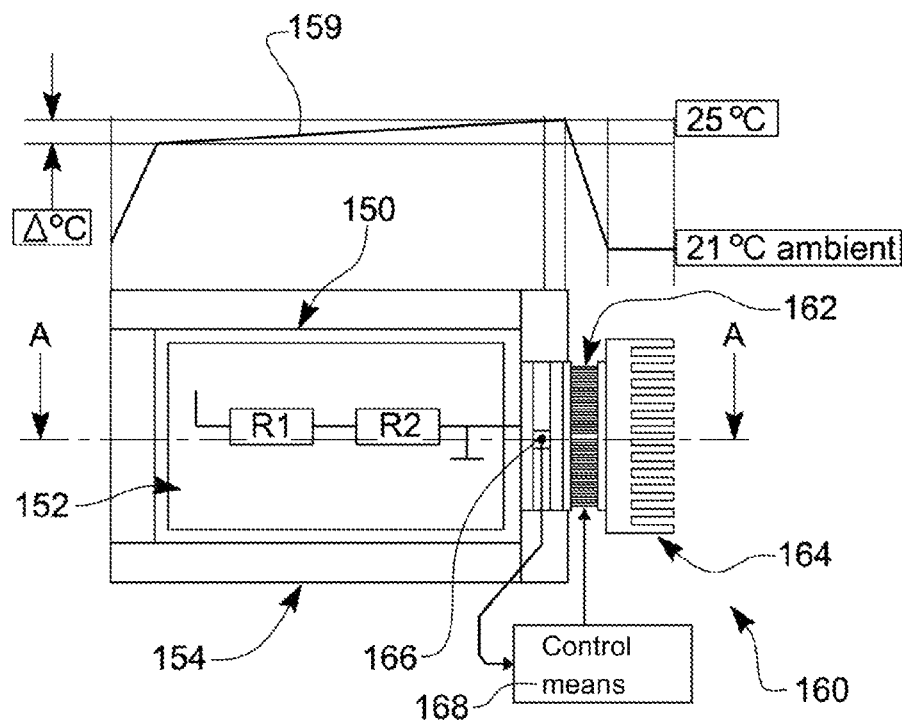
FIG. 2 is a simplified diagram showing a cross section through an enclosure of the control module of FIG. 1.

FIG. 2 is a simplified diagram showing a cross section through the enclosure 150 of the control module 110 of FIG. 1.

Preferably, the enclosure 150 is provided with a temperature control unit 160 configured to heat and/or cool the enclosure so as to maintain a substantially constant temperature within the enclosure 150.

The temperature control unit may include a thermoelectric device 162 configured to heat and/or cool the enclosure. The thermoelectric device 162 is preferably mounted to, e.g. bonded to, a (preferably thermally conductive) wall of the enclosure 150. A preferred thermoelectric device 162 is a peltier device (which may also be referred to as a peltier cooler). A peltier device is preferred as it is able to perform both heating and cooling functions, depending on which direction current is passed through it. Furthermore, magnitude of the heating/cooling function is controlled by the magnitude of current through the peltier device. A heatsink 164 is preferably bonded to the thermoelectric heating/cooling device 162 and exposed to ambient air.

The temperature control unit 160 preferably includes a heat sensor, preferably a thermistor 166, configured to measure the temperature within the enclosure 150, e.g. it may be located in or near to the enclosure 150 and/or be configured to output a signal representative of the temperature within the enclosure 150. Preferably, the temperature control unit 160 further includes a control means 168 configured, based on the output of the heat sensor (thermistor 166), to control the thermoelectric device 162 to heat and/or cool the enclosure 150 so as to maintain a substantially constant temperature within the enclosure 150.

For example, the control means 168 may include an op-amp configured to compare an output of the thermistor 166 with a fixed resistance (not shown), e.g. in a bridge arrangement, and to use a switch mode power supply (for improved efficiency) to generate current for the thermoelectric device 162. Preferably, these components are configured to employ negative feedback, such that the difference between the output of the thermistor 166 and the fixed resistance is minimised, thereby maintaining a substantially constant temperature within the enclosure 150.

As illustrated by FIG. 2, in general, there will be a thermal gradient 159 through the enclosure 150, owing to heat entering into and escaping from the enclosure ("thermal leakage"). The thermal gradient 159 illustrated in FIG. 2 shows the thermal gradient 159 in an embodiment in which the temperature control unit is configured to maintain a substantially constant temperature of 25° C. in the enclosure and the ambient temperature is 21° C.

Preferably, the enclosure 150 has thermally conductive walls, e.g. of aluminium. Preferably, the enclosure contains thermally conductive material 152 which is in contact with one or more of the at least one temperature-sensitive component located in the enclosure 150. The thermally conductive material 152 is preferably electrically insulative, and may, for example, be electrically insulative potting material (which may also be referred to as encapsulant), such as thermally conductive silicone rubber or epoxy resin. These features may help to distribute heat evenly throughout the enclosure, thereby helping to minimise the thermal gradient through the enclosure and to maintain a substantially constant temperature within (and throughout) the enclosure.

Preferably, the enclosure 150 is thermally insulated by thermal insulation 154, e.g. expanded polystyrene (also referred to as polystyrene foam), which preferably surrounds the enclosure 150. This may help to reduce the amount of heat entering into and escaping from the enclosure 150, thereby helping to minimise the thermal gradient through the enclosure and to maintain a substantially constant temperature within the enclosure.

Figure 3:
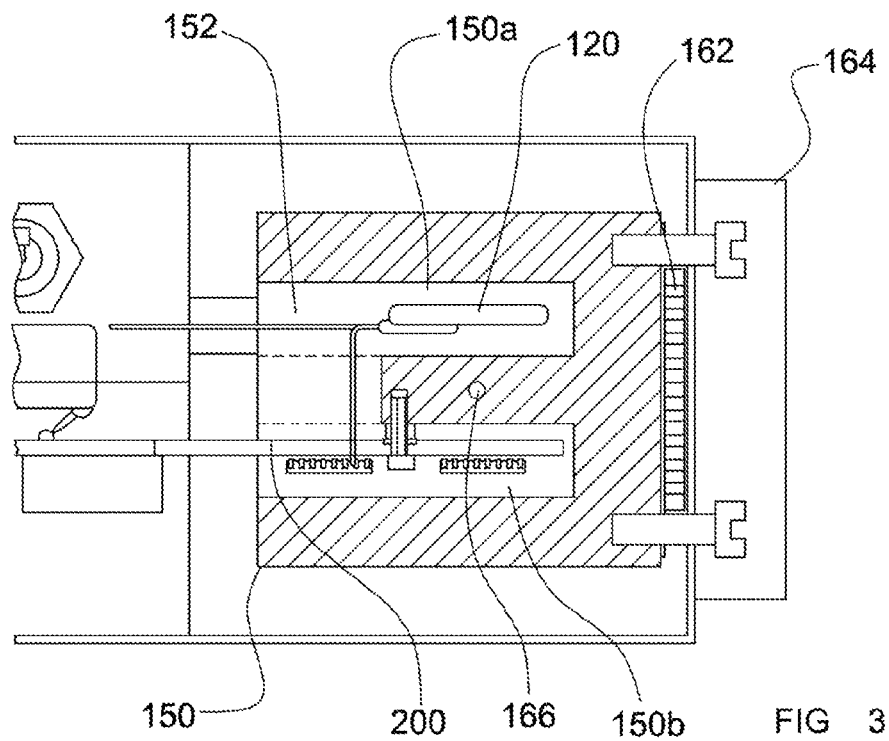
FIG. 3 is a cross section through the enclosure taken through the line A-A shown in FIG. 2.

FIG. 3 is a cross section through the enclosure 150 taken through the line A-A shown in FIG. 2.

As shown in FIG. 3, the enclosure 150 preferably has at least two compartments 150*a*, 150*b*, preferably with the voltage divider 120 being contained in a first of the compartments 150*a* and at least one other temperature sensitive component of the control circuitry being contained in the other compartment 150*b*. This helps to electrically insulate any high voltages within the voltage divider 120 from the at least one other temperature-sensitive components of the control circuitry. Preferably, at least one temperature-sensitive component of the control circuitry is mounted on a control circuitry region of a circuit board.

For completeness, it is noted that there are some differences, e.g. in terms of the location and size of components, between FIGS. 2 and 3. This is because FIG. 2 is a simplified diagram.

The arrangements shown in FIGS. 2 and 3 are thought to help to reduce mechanical stress on the temperature-sensitive components, maintain insulation, achieve close thermal contact with the temperature-sensitive components, and are easy to produce.

Figure 4:
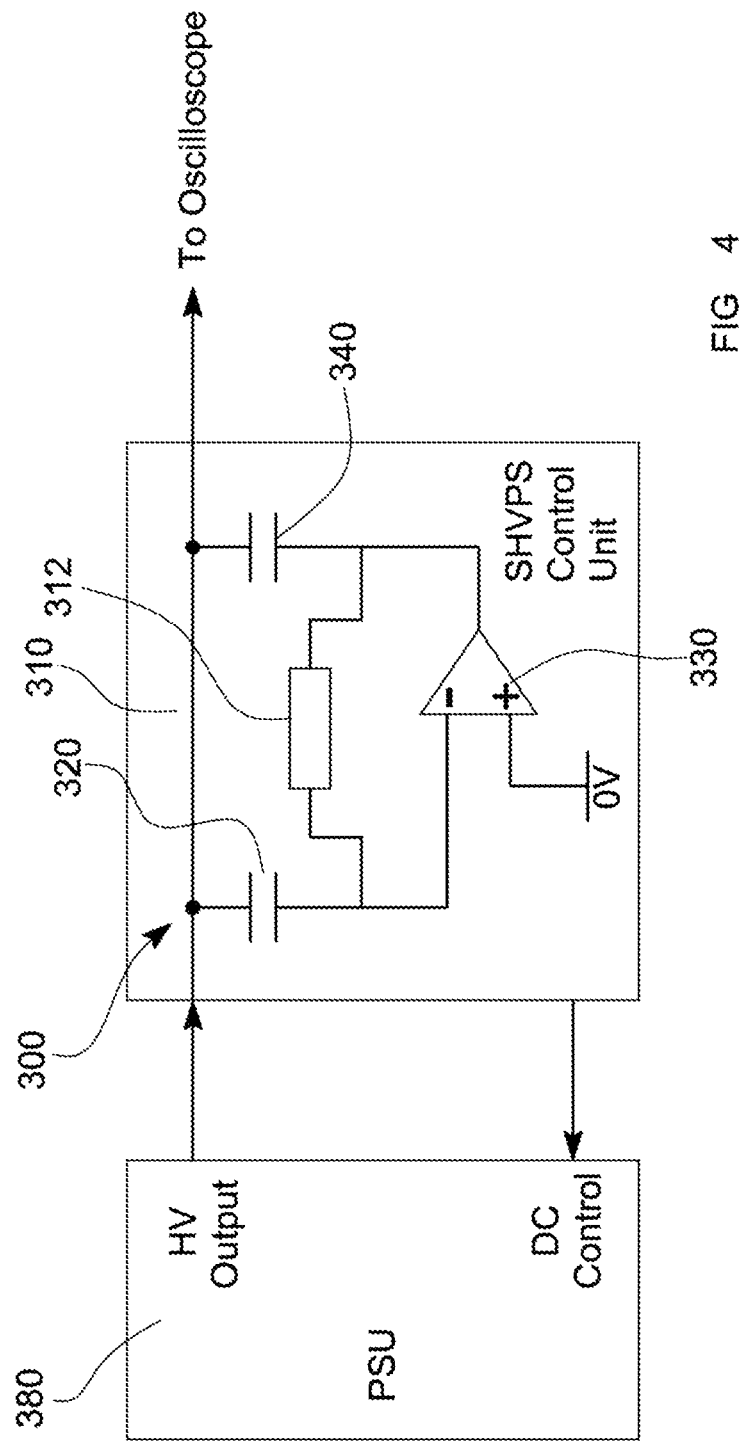
FIG. 4 shows noise reduction circuitry for reducing noise in a DC voltage outputted by a DC power supply.

FIG. 4 illustrates noise reduction circuitry 300 for reducing noise in a DC voltage outputted by a DC power supply.

FIG. 4 shows the noise reduction circuitry 300 in an experimental apparatus, where the noise reduction circuitry 300 is contained in a noise reduction module 310 and receives a DC voltage from a separate power supply 380, which may for example be a proprietary, i.e. commercially available, "high voltage" DC power supply capable of outputting a DC voltage $V_{DC}$ of 1000 Volts or more.

Electrical noise, which may be thermal in nature, or induced from an external influence, can perturb the DC voltage outputted by a DC power supply. For high voltage DC power supplies, such noise is generally transitory in nature and composed of a wide band of frequencies excluding DC.

The noise reduction circuitry 300 shown in FIG. 4 preferably includes an extracting means configured to extract a noise component from a DC voltage outputted by the DC power supply 380; an inverting means configured to invert the noise component; and a combining means configured to combine the inverted noise component with the DC voltage outputted by the DC power supply 380.

Preferably, the extracting means includes a DC blocking capacitor 320, which is preferably configured to extract the noise component by extracting only AC changes from the DC voltage outputted by the DC power supply.

Preferably, the inverting means includes an op-amp 330, whose inverting input is connected (directly or indirectly) to the extracting means. The other input of the op-amp 330 is preferably held constant at a ground potential.

Preferably, the combining means includes a DC blocking capacitor 340, which is preferably coupled to the output of the op-amp 330 and configured to combine the inverted noise component with the DC voltage outputted by the DC power supply 380.

Advantageously, if the DC power supply 380 is a high voltage DC power supply and high voltage DC blocking capacitors are respectively included in the extracting means and combining means, then the inverting means, which is preferably an op-amp 330, is able to operate at near ground potential and so does not need to be of a high voltage type.

Preferably, in use, an AC virtual earth is created at the inverting input of the op-amp 330 such that negative feedback causes the op-amp 330 to reduce AC changes of the DC voltage outputted by the DC power supply to near zero.

Thus, the noise reduction circuitry reduces noise in the DC voltage outputted by the DC power supply by extracting the noise, inverting it, and recombining it with the original DC voltage.

In general, it is helpful for the op-amp 330 to have a DC path between its inverting (−ve) input and its output, so as to bias it for stable mid supply operation. This could be achieved e.g. using a resistor 312 having a resistance $R_{BIAS}$ as shown in FIG. 4, but other arrangements are possible. In general, this resistance $R_{BIAS}$ and the capacitance C of the DC blocking capacitor 320 will determine the low frequency roll off point of the signal coupled to the input of the op-amp 330, e.g. according to the equation $f=\frac{1}{2}*pi*R_{BIAS}*C$. The output of the op-amp 330 will also have a roll-off point that will in general be determined by the capacitance of the output DC blocking capacitor 340 and the impedance of the DC power supply 380, the latter which will generally be complex and of a lower value than the resistor $R_{BIAS}$.

At first it may appear therefore that the overall low frequency roll off point is determined by the output side of the op-amp 330 (generally being of lower resistance) but the high gain of the op-amp 330 effectively multiplies the apparent value of the DC blocking capacitor 340 and compensates for the higher roll off point, effectively making it lower.

Stability can be a problem with the noise reduction circuitry 300 shown in FIG. 4 as load or HV power supply impedance changes can cause the overall feedback to become positive resulting in oscillation. This can be complicated further, if the noise reduction circuitry is used with the above-described control circuitry, since the DC control loop of the control circuitry may have a high frequency roll off point which, if it comes too close to that of the noise reduction circuitry, may cause the whole system to oscillate.

It may therefore be desirable to add more capacitor and resistor networks to introduce additional phase changes to prevent this, as would be appreciated by a person skilled in the art.

As can be seen from the above discussion, the reduction in noise achieved by the noise reduction circuitry shown in FIG. 4 is generally effective over a frequency bandwidth determined by resistor values, capacitor values and the high frequency limitations of the op-amp 330. Accordingly, AC noise and externally induced disturbances in the DC voltage outputted by the DC power supply can be minimised over a selected bandwidth, which preferably includes the switching frequency of the DC power supply.

Although not illustrated by FIG. 4, the noise reduction circuitry 300 is preferably included in the control circuitry of the control module 110 described above with reference to FIGS. 1 to 3. In this case, the noise reduction circuitry 300 may be configured to receive the DC voltage $V_{DC}$ before or after that DC voltage is received by the control circuitry described above with reference to FIGS. 1 to 3.

The noise reduction circuitry could potentially use some series resistance in order to improve its performance in some configurations, but such an arrangement may be undesirable in some cases as a HV discharge to ground could stress and possibly damage any series resistor.

Experimental Work
Experiment 1

An experimental measuring apparatus incorporating a thermally stabilised voltage divider, and 30 kV DC power supply, were used to test a control module 110 constructed as illustrated by FIGS. 1 to 3.

The 30 kV DC power supply used was a 30 kV DC power supply made by Applied Kilovolts Ltd. It had a 0V to 10V control input (for receiving a control signal) and was capable of a 0V to ±30 kV output. In more detail, the DC power supply was a High Power Reversible ("HPR") power supply, an explanation of which can, for example, be found on http://www.appliedkilovolts.com/pahpr.php.

Firstly, the 30 kV DC power supply was placed in a test oven (not shown) and the control input of the 30 kV DC power supply was connected to a (notionally) fixed reference voltage such that the DC voltage outputted by the DC power supply was about 3 kV at 20° C. The temperature in the oven was then varied by ±5° C. and the DC voltage outputted by the 30 kV DC power supply measured using the experimental measuring apparatus.

Figure 5:
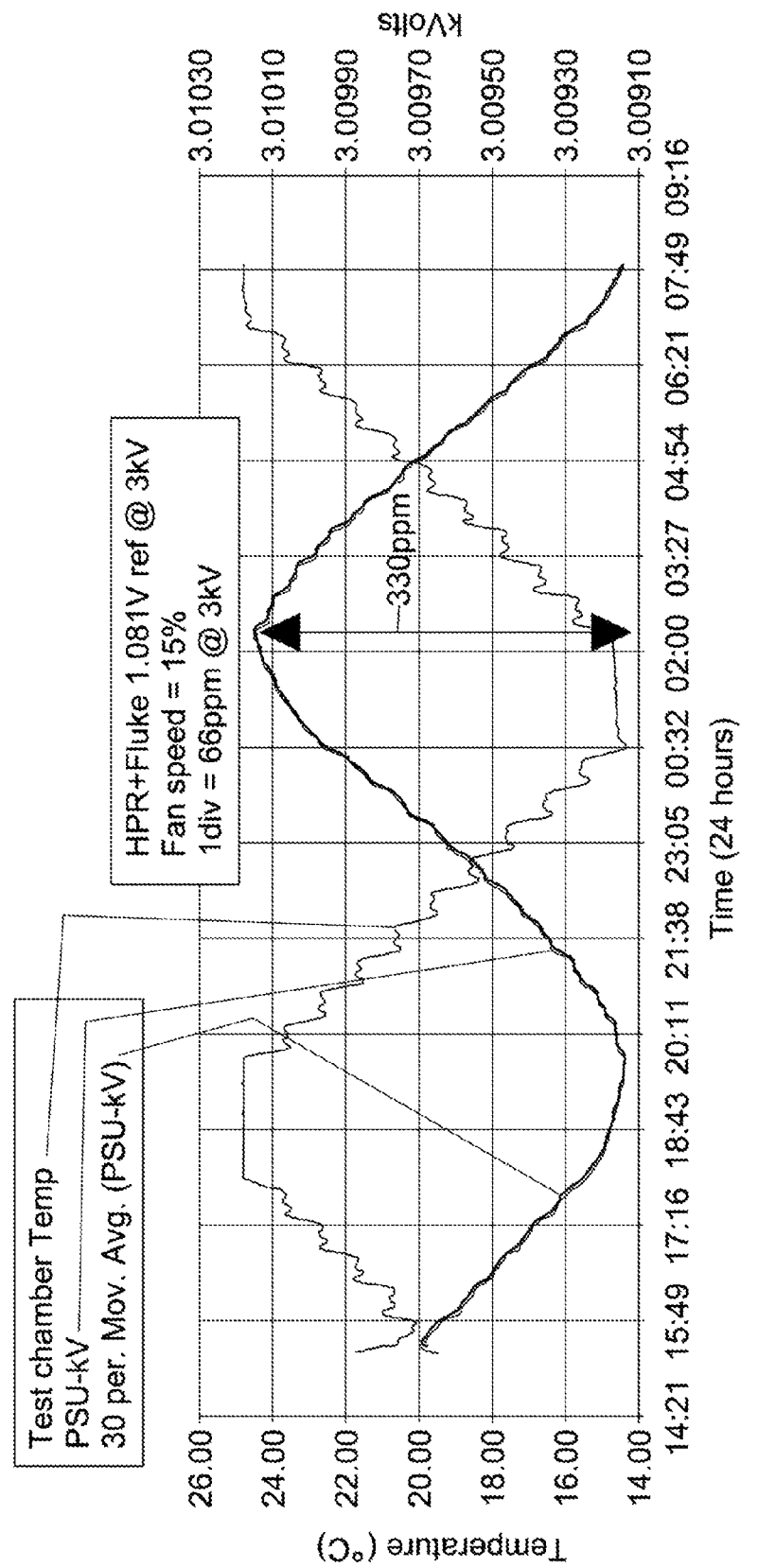
FIGS. 5 and 6 are plots showing the results of analysis performed in a first experiment.

FIG. 5 is a plot showing the results of this analysis.

As shown in FIG. 5, there is a variation of ~330 ppm in the DC voltage outputted by the 30 kV DC power supply as temperature varies by ~10° C. Therefore, there is an overall drift in the DC voltage outputted by the 30 kV DC power supply of ~33 ppm/° C.

Next, the control module 110 illustrated by FIGS. 1 to 3 was also placed in the oven and the control input of the 30 kV DC power supply was connected to the control module 110 so that the control signal from the control circuitry was received at the control input of the 30 kV DC power supply. The reference voltage $V_{REF}$ was set such that the DC voltage outputted by the DC power supply was about 10 kV at 20° C. The temperature in the oven was then varied by ±5° C. and the DC voltage outputted by the 30 kV DC power supply measured using the experimental measuring apparatus.

Figure 6:
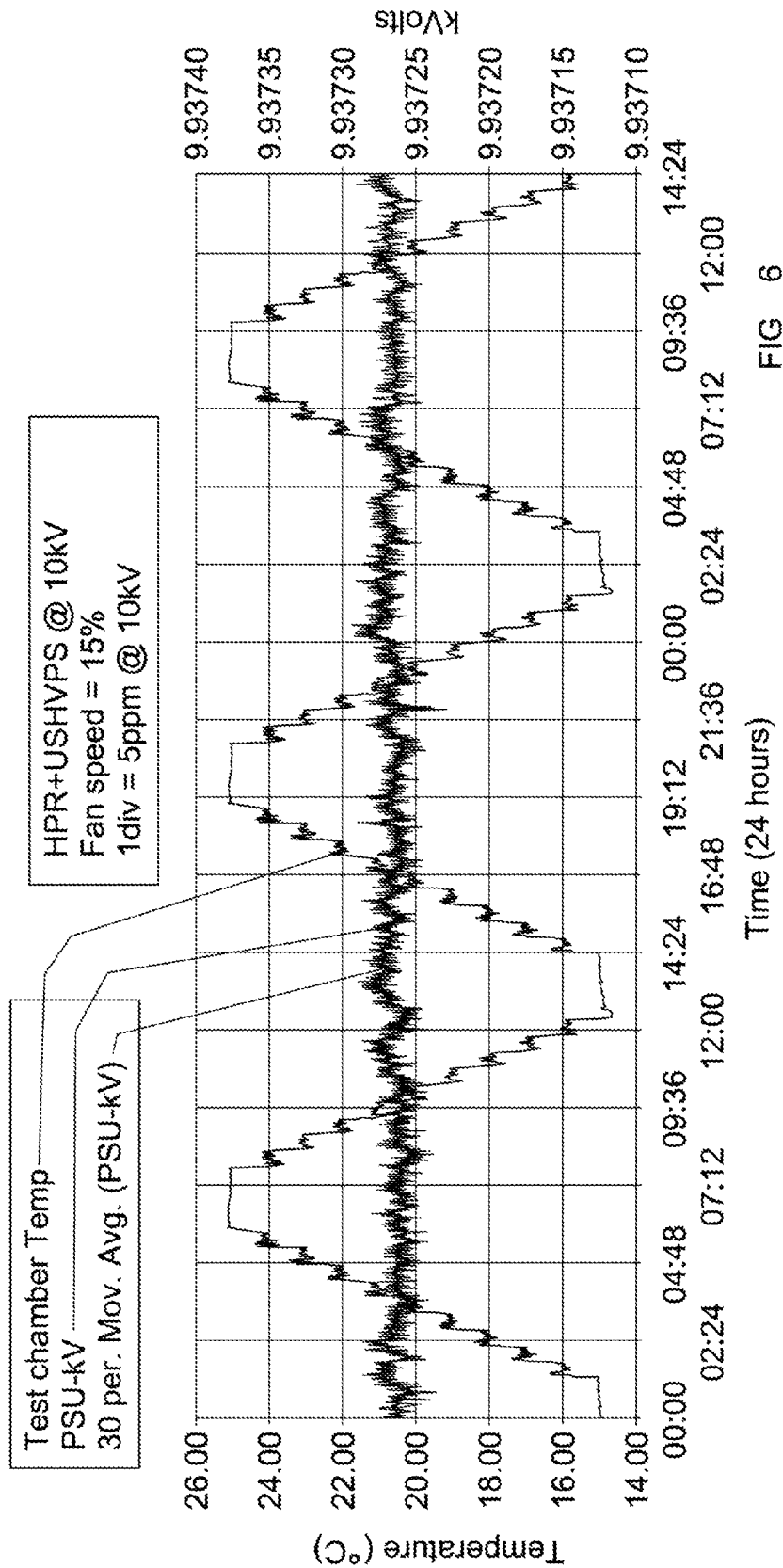

FIG. 6 is a plot showing the results of this analysis. In FIG. 6, it is very difficult to see any variation in the DC voltage outputted by the 30 kV DC power supply due to the temperature variation of ~10° C., since any variation that is present is so small that it is obscured by noise.

Experiment 2

In Experiment 2, the experimental measuring apparatus described in connection with Experiment 1 and the 30 kV DC power supply were used to test the noise reduction circuitry 300 shown in FIG. 4.

Figure 7:
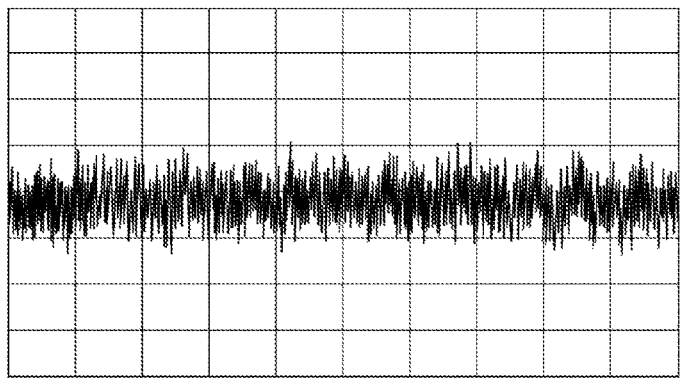
FIG. 7 is a plot showing the noise in a DC voltage outputted by a 30 kV DC power supply.

FIG. 7 is a plot showing the noise in a DC voltage outputted by the 30 kV DC power supply as measured using a 27 nF capacitor into a 100 MOhm pre amp. Here, the noise is of the scale of ~6.6 ppm over the frequency range 58 mHz to 3 MHz.

The noise in a DC voltage outputted by the 30 kV DC power supply was measured by the experimental measuring apparatus, after the DC voltage outputted by the 30 kV DC power supply has been passed through the noise reduction circuitry 300 shown in FIG. 4.

Figure 8A:
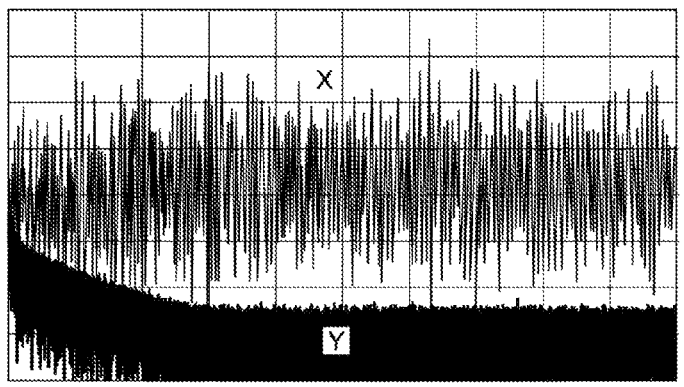
FIGS. 8a and 8b are plots showing the results of analysis performed in a second experiment.
Figure 8B:
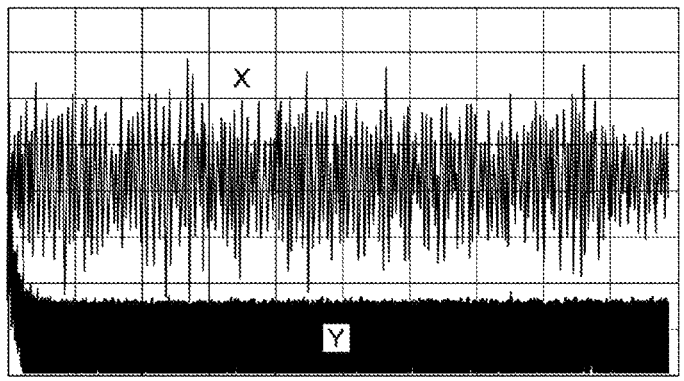

FIGS. 8a and 8b are plots showing the results of this analysis.

FIG. 8a shows the noise when the noise reduction circuitry 300 is turned "off" (i.e. no power was supplied to the op-amp 330 of the noise reduction circuitry 300), whereas FIG. 8b shows the noise when the noise reduction circuitry 300 is turned "on" (i.e. power was supplied to the op-amp 330). In both FIGS. 8a and 8b, the plot labelled "X" is a plot of voltage against time whereas the plot labelled "Y" is a Fourier transform of the plot of voltage against time, and in effect shows noise against frequency.

By comparing FIGS. 8a and 8b, it can be seen that the noise reduction circuitry, when turned on, considerably reduces the amount of noise present at higher frequencies between 30 Hz to 3 kHz but does little to reduce noise at lower frequencies below 30 Hz.

As noise can be caused by vibration, it is generally useful to reduce vibrations within the 30 kV power supply.

Experiment 3

In a third experiment, the experimental measuring apparatus described in connection with the first experiment and the 30 kV DC power supply were used to test the noise reduction circuitry 300 shown in FIG. 4.

Figure 9:
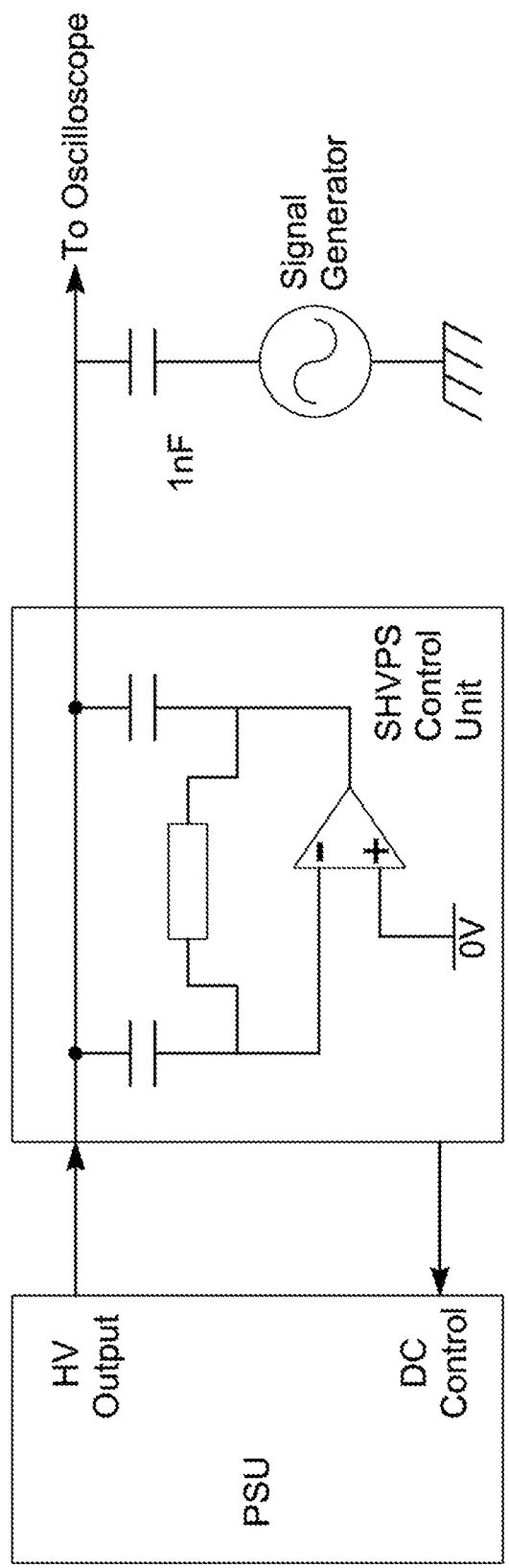
FIG. 9 shows an experimental apparatus used in a third experiment.
Figure 10A:
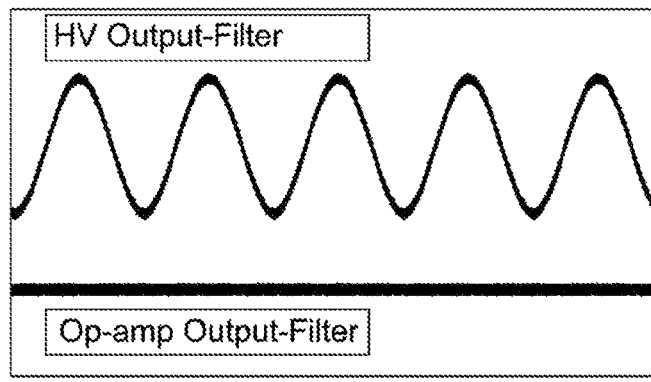
Figure 10B:
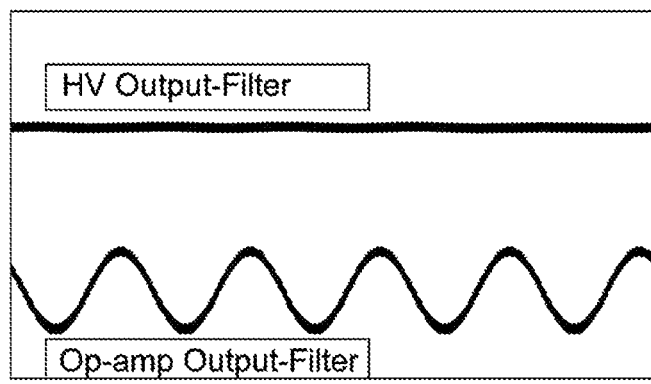
Figure 10C:
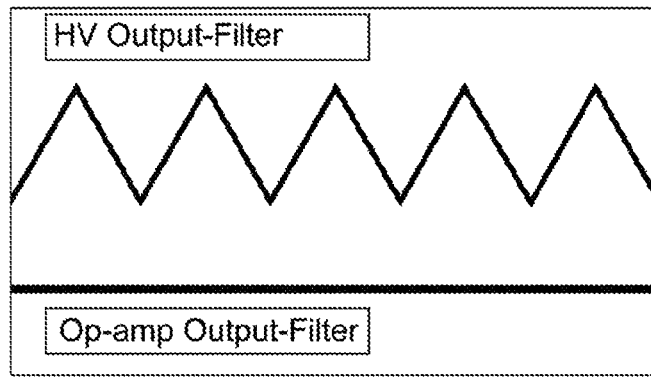
Figure 10D:
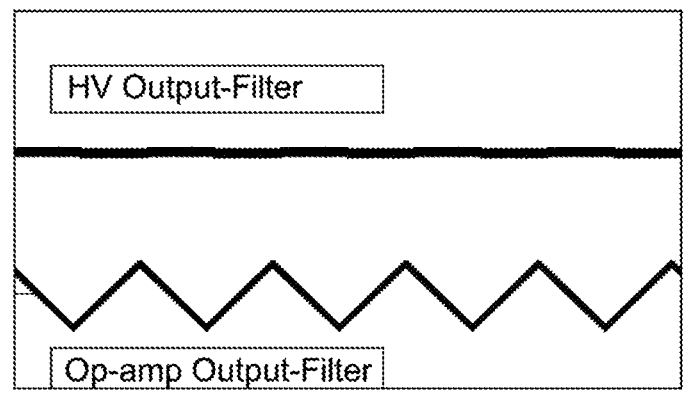
Figure 10E:
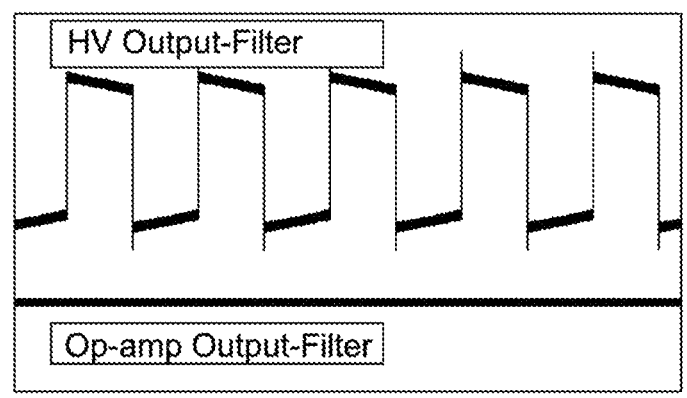
Figure 10F:
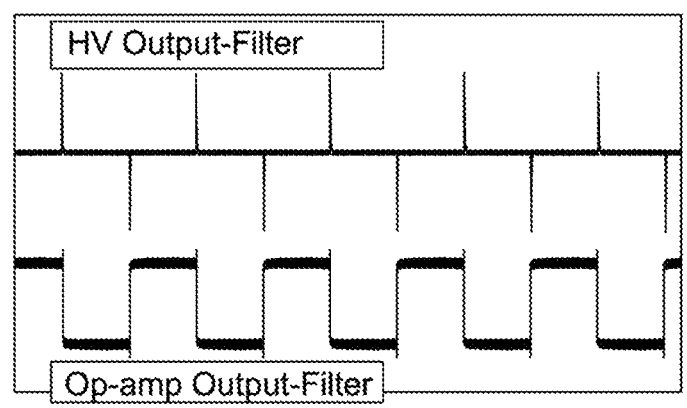

FIG. 9 shows the test circuit used in the third experiment.

The noise reduction circuit shown in FIG. 9 is the same as the noise reduction circuit shown in FIG. 4, except that an additional noise coupling source has been added, the additional noise coupling source consisting of a signal generator with 1 nF coupling capacitor to allow a test signal to be injected onto the DC voltage outputted by the 30 kV DC power supply.

In the third experiment, the op-amp is first disabled with a shorting link between negative input and output. The coupling capacitors are left in circuit at all times and a disturbing signal injected from the signal generator. The shorting link is then removed. In this way, a before and after filter activation pair of measurements can be made.

A considerable reduction of a 1 kHz sine wave disturbance is evident to around 37 dB when the active filter is enabled by removing the shorting link. This attenuation of the disturbance is dependent on the gain bandwidth of the op amp used at higher frequencies and the size of the coupling capacitors at lower frequencies. In addition, the ability of the noise reduction circuit to reduce the disturbance is dependent on the amplitude of the disturbance—the limiting factor is the available output swing of the op-amp which is typically around +/−13V or so.

FIG. 10 contains plots showing the results of analysis performed in a third experiment.

In FIG. 10 typical responses are shown for a sine wave, a triangular wave and a square wave disturbance at 1 kHz injected from the signal generator of FIG. 9. In FIG. 10, both the High Voltage DC is shown accompanied by the op-amp output.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure, without departing from the broad concepts disclosed. It is therefore intended that the scope of the patent granted hereon be limited only by the appended claims, as interpreted with reference to the description and drawings, and not by limitation of the embodiments described herein.

The following clauses describe preferred aspects of the invention.

A1. A control circuitry arrangement that includes control circuitry for stabilising a DC voltage outputted by a DC power supply against changes in ambient temperature, the control circuitry including: measurement circuitry configured to output a measurement voltage representative of a DC voltage outputted by a DC power supply; reference circuitry configured to output a reference voltage; and comparison circuitry configured to compare the measurement voltage with the reference voltage and, based on the comparison, output a control signal for controlling the DC voltage outputted by the DC power supply; wherein at least one temperature-sensitive component of the control circuitry is located in an enclosure configured to maintain a substantially constant temperature within the enclosure.

A2. A control circuitry arrangement according to clause A1 wherein the control circuitry and enclosure are included in a control module for stabilising a DC voltage outputted by an external DC power supply against changes in ambient temperature.

A3. A control circuitry arrangement according to clause A1 or A2 wherein the at least one temperature-sensitive component includes any one or more of a voltage divider of the measurement circuitry, a digital to analogue converter of the reference circuitry, an analogue voltage source of the reference circuitry, and a comparator of the comparison circuitry.

A4. A control circuitry arrangement according to any one of the previous clauses wherein the enclosure: includes thermally conductive walls; contains thermally conductive material which is in contact with at least one temperature-sensitive component of the control circuitry located in the enclosure; and/or is thermally insulated by thermal insulation which surrounds the enclosure.

A5. A control circuitry arrangement according to any one of the previous clauses wherein the enclosure is provided with a temperature control unit configured to heat and/or cool the enclosure so as to maintain a substantially constant temperature within the enclosure.

A6. A control circuitry arrangement according to clause A5 wherein the temperature control unit include a thermoelectric device configured to heat and/or cool the enclosure.

A7. A control circuitry arrangement according to clause A6 wherein the temperature control unit further includes: a thermistor configured to measure the temperature within the enclosure; and a control means configured, based on an output of the thermistor, to control the thermoelectric device to heat and/or cool the enclosure so as to maintain a substantially constant temperature within the enclosure.

A8. A control circuitry arrangement according to any one of the previous clauses wherein: at least one temperature-sensitive component of the control circuitry is mounted on a control circuitry region of a circuit board; and the control circuitry region and the enclosure are mutually configured to allow the control circuitry region to be inserted into the enclosure.

A9. A control circuitry arrangement according to any one of the previous clauses wherein the enclosure has at least two compartments, with at least one temperature-sensitive component of the control circuitry being located in a first of the compartments and at least one other temperature-sensitive component of the control circuitry being located in a second of the compartments.

A10. A control circuitry arrangement according to any one of the previous clauses wherein the measurement circuitry includes a voltage divider configured to output a measurement voltage representative of a DC voltage outputted by a DC power supply, the voltage divider including two resistors arranged in series and configured to receive the DC voltage outputted by the DC power supply, a first of the two resistors having a resistance that is n−1 times larger than a second of the two resistors, where n is more than 1.

A11. A control circuitry arrangement according to any one of the previous clauses wherein the reference circuitry includes a digital to analogue converter configured to output the reference voltage.

A12. A control circuitry arrangement according to clause 11 wherein the DAC is configured to output the reference voltage based on a preliminary reference voltage outputted by an analogue voltage source and a digital control signal outputted by a digital control unit.

A13. A control circuitry arrangement according to any one of the previous clauses wherein the comparison circuitry is configured, based on the comparison between the measurement voltage and the reference voltage, to output a control signal for controlling the DC voltage outputted by the DC power supply such that the DC voltage outputted by the DC power supply is kept substantially constant.

A14. A control circuitry arrangement according to any one of the previous clauses wherein the comparison circuitry includes a comparator configured to compare the measurement voltage with the reference voltage and, based on the comparison, output a signal that is representative of the difference between the measurement voltage and the reference voltage.

A15. A control circuitry arrangement according to clause A14 wherein the comparison circuitry includes conditioning means for conditioning the signal outputted by the comparator, such that the conditioned signal is the control signal outputted by the comparison circuitry for controlling the DC voltage outputted by the DC power supply.

A16. A control circuitry arrangement according to clause A14 or A15 wherein the conditioning means includes a damping means configured to damp the signal outputted by the comparator.

A17. A control circuitry arrangement according to any one of the previous clauses wherein the control circuitry includes noise reduction circuitry for reducing noise in the DC voltage outputted by the DC power supply, the noise reduction circuit comprising: an extracting means configured to extract a noise component from the DC voltage outputted by the DC power supply; an inverting means configured to invert the noise component; and a combining means configured to combine the inverted noise component with the DC voltage outputted by the DC power supply.

A18. A control circuitry arrangement according to clause A17 wherein: the extracting means includes a DC blocking capacitor configured to extract the noise component by extracting only AC changes from the DC voltage outputted by the DC power supply; the inverting means includes an op-amp, whose inverting input is connected to the extracting means; and the combining means includes a DC blocking capacitor configured to combine the inverted noise component from the inverting means with the DC voltage outputted by the DC power supply.

A19. An apparatus including a control circuitry arrangement according to any one of the previous clauses and further including the DC power supply.

A20. An apparatus according to clause A19 wherein the DC power supply is configured to receive the control signal at a control signal input of the DC power supply.

A21. A method of stabilising a DC voltage outputted by a DC power supply against changes in ambient temperature using control circuitry that includes measurement circuitry, reference circuitry and comparison circuitry, the method including: the measurement circuitry outputting a measurement voltage representative of a DC voltage outputted by a DC power supply; the reference circuitry outputting a reference voltage; and the comparison circuitry comparing the measurement voltage with the reference voltage and, based on the comparison, outputting a control signal for controlling the DC voltage outputted by the DC power supply; wherein at least one temperature-sensitive component of the control circuitry is located in an enclosure and a substantially constant temperature is maintained within the enclosure during the method.

A22. A control module for stabilising a DC voltage outputted by an external DC power supply against changes in ambient temperature.

A23. Noise reduction circuitry for reducing noise in a DC voltage outputted by a DC power supply, the noise reduction circuit comprising: an extracting means configured to extract a noise component from the DC voltage outputted by the DC power supply; an inverting means configured to invert the noise component; and a combining means configured to combine the inverted noise component with the DC voltage outputted by the DC power supply.

A24. An apparatus, a control module, control circuitry or noise reduction circuitry substantially as any one embodiment herein described with reference to and as shown in the accompanying drawings.

A25. A method substantially as any one embodiment herein described with reference to and as shown in the accompanying drawings.

The invention claimed is:

1. A control module for stabilising a DC voltage outputted by an external DC power supply against changes in ambient temperature, wherein the control module includes control circuitry and an enclosure configured to maintain a substantially constant temperature within the enclosure;
wherein the external DC power supply includes its own control circuitry for stabilising the DC voltage outputted by the external DC power supply, the control circuitry included in the external DC power supply having measurement circuitry, reference circuitry and comparison circuitry;
wherein the control circuitry included in the control module is additional to and configured to work alongside and influence the control circuitry in the external DC power supply, wherein the control circuitry included in the control module includes:
measurement circuitry configured to output a measurement voltage representative of the DC voltage outputted by the external DC power supply;
reference circuitry configured to output a reference voltage; and
comparison circuitry configured to compare the measurement voltage with the reference voltage and, based on the comparison, output a control signal for controlling the DC voltage outputted by the external DC power supply;
wherein at least one temperature-sensitive component of the control circuitry included in the control module is located in the enclosure configured to maintain a substantially constant temperature within the enclosure.

2. A control module according to claim 1, wherein the control module includes a control signal output configured to output the control signal so as to be received at a control signal input of the external DC power supply.

3. A control module according to claim 1, wherein the control module includes:
a coupling means for coupling the DC voltage outputted by the external DC power supply to the measurement circuitry included in the control module, wherein the coupling means includes a DC input configured to receive the DC voltage outputted by the external DC power supply;
a DC output, coupled to the DC input, so as to re-output the DC voltage received at the DC input.

4. A control module according to claim 1, wherein the at least one temperature-sensitive component includes any one or more of a voltage divider of the measurement circuitry included in the control module, a digital to analogue converter of the reference circuitry included in the control module, an analogue voltage source of the reference circuitry included in the control module, and a comparator of the comparison circuitry included in the control module.

5. A control module according to claim 1, wherein the at least one temperature-sensitive component includes an analogue voltage source of the reference circuitry included in the control module.

6. A control module according to claim 1, wherein the enclosure:
includes thermally conductive walls;
contains thermally conductive material which is in contact with at least one temperature-sensitive component of the control circuitry located in the enclosure; and/or
is thermally insulated by thermal insulation which surrounds the enclosure.

7. A control module according to claim 1, wherein the enclosure is provided with a temperature control unit configured to heat and/or cool the enclosure so as to maintain a substantially constant temperature within the enclosure.

8. A control module according to claim 7, wherein the temperature control unit includes:
a thermoelectric device configured to heat and/or cool the enclosure;
a thermistor configured to measure the temperature within the enclosure; and
a control means configured, based on an output of the thermistor, to control the thermoelectric device to heat and/or cool the enclosure so as to maintain a substantially constant temperature within the enclosure.

9. A control module according to claim 1, wherein:
at least one temperature-sensitive component of the control circuitry included in the control module is mounted on a control circuitry region of a circuit board; and
the control circuitry region and the enclosure are mutually configured to allow the control circuitry region to be inserted into the enclosure.

10. A control module according to claim 1, wherein the enclosure has at least two compartments, with at least one temperature-sensitive component of the control circuitry included in the control module being located in a first of the compartments and at least one other temperature-sensitive component of the control circuitry included in the control module being located in a second of the compartments.

11. A control module according to claim 1, wherein the measurement circuitry included in the control module includes a voltage divider configured to output a measurement voltage representative of the DC voltage outputted by a the external DC power supply, the voltage divider including two resistors arranged in series and configured to receive the DC voltage outputted by the external DC power supply, a first of the two resistors having a resistance that is n−1 times larger than a second of the two resistors, where n is more than 1.

12. A control module according to claim 1, wherein the reference circuitry included in the control module includes a digital to analogue converter (DAC) configured to output the reference voltage, wherein the DAC is configured to output the reference voltage based on a preliminary reference voltage outputted by an analogue voltage source and a digital control signal outputted by a digital control unit.

13. A control module according to claim 1, wherein the comparison circuitry included in the control module is configured, based on the comparison between the measurement voltage and the reference voltage, to output a control signal for controlling the DC voltage outputted by the external DC power supply such that the DC voltage outputted by the external DC power supply is kept substantially constant.

14. A control module according to claim 1, wherein the comparison circuitry included in the control module includes a comparator configured to compare the measurement voltage with the reference voltage and, based on the comparison, output a signal that is representative of the difference between the measurement voltage and the reference voltage.

15. A control module according to claim 1, wherein the control circuitry includes noise reduction circuitry for reducing noise in the DC voltage outputted by the external DC power supply, the noise reduction circuit comprising:
 an extracting means configured to extract a noise component from the DC voltage outputted by the external DC power supply;
 an inverting means configured to invert the noise component; and
 a combining means configured to combine the inverted noise component with the DC voltage outputted by the DC power supply.

16. A control module according to claim 15, wherein:
 the extracting means includes a DC blocking capacitor configured to extract the noise component by extracting only AC changes from the DC voltage outputted by the external DC power supply;
 the inverting means includes an op-amp, whose inverting input is connected to the extracting means; and
 the combining means includes a DC blocking capacitor configured to combine the inverted noise component from the inverting means with the DC voltage outputted by the external DC power supply.

17. A control module according to claim 1, wherein the control module is included in an apparatus, wherein the apparatus includes the external DC power supply, wherein the control module is separate from the external DC power supply, and wherein the external DC power supply is configured to receive the control signal at a control signal input of the DC power supply.

18. A control module according to claim 17, wherein the external DC power supply is configured to be controlled such that the DC voltage outputted by the external DC power supply is correlated to the voltage at the control signal input of the external DC power supply.

19. A control module according to claim 17, wherein the external DC power supply is capable of supplying a voltage of 1000 Volts or more.

20. A method of stabilising a DC voltage outputted by an external DC power supply against changes in ambient temperature using the control circuitry included in a control module, wherein the control module includes control circuitry and an enclosure configured to maintain a substantially constant temperature within the enclosure;
 wherein the external DC power supply includes its own control circuitry for stabilising the DC voltage outputted by the external DC power supply, the control circuitry included in the external DC power supply having measurement circuitry, reference circuitry and comparison circuitry;
 wherein the control circuitry included in the control module is additional to and configured to work alongside and influence the control circuitry in the external DC power supply, wherein the control circuitry included in the control module includes:
  measurement circuitry configured to output a measurement voltage representative of the DC Voltage outputted by the external DC power supply;
  reference circuitry configured to output a reference voltage; and
  comparison circuitry configured to compare the measurement voltage with the reference voltage and, based on the comparison, output a control signal for controlling the DC voltage outputted by the external DC power supply;
 wherein at least one temperature-sensitive component of the control circuitry is located in the enclosure configured to maintain a substantially constant temperature within the enclosure
 wherein the method includes:
 the measurement circuitry included in the control module outputting a measurement voltage representative of the DC voltage outputted by a the external DC power supply;
 the reference circuitry included in the control module outputting a reference voltage; and
 the comparison circuitry included in the control module comparing the measurement voltage with the reference voltage and, based on the comparison, outputting a control signal for controlling the DC voltage outputted by the external DC power supply.

* * * * *